(No Model.) 2 Sheets—Sheet 1.
M. P. ELGEN.
BALING PRESS.
No. 540,652. Patented June 11, 1895.
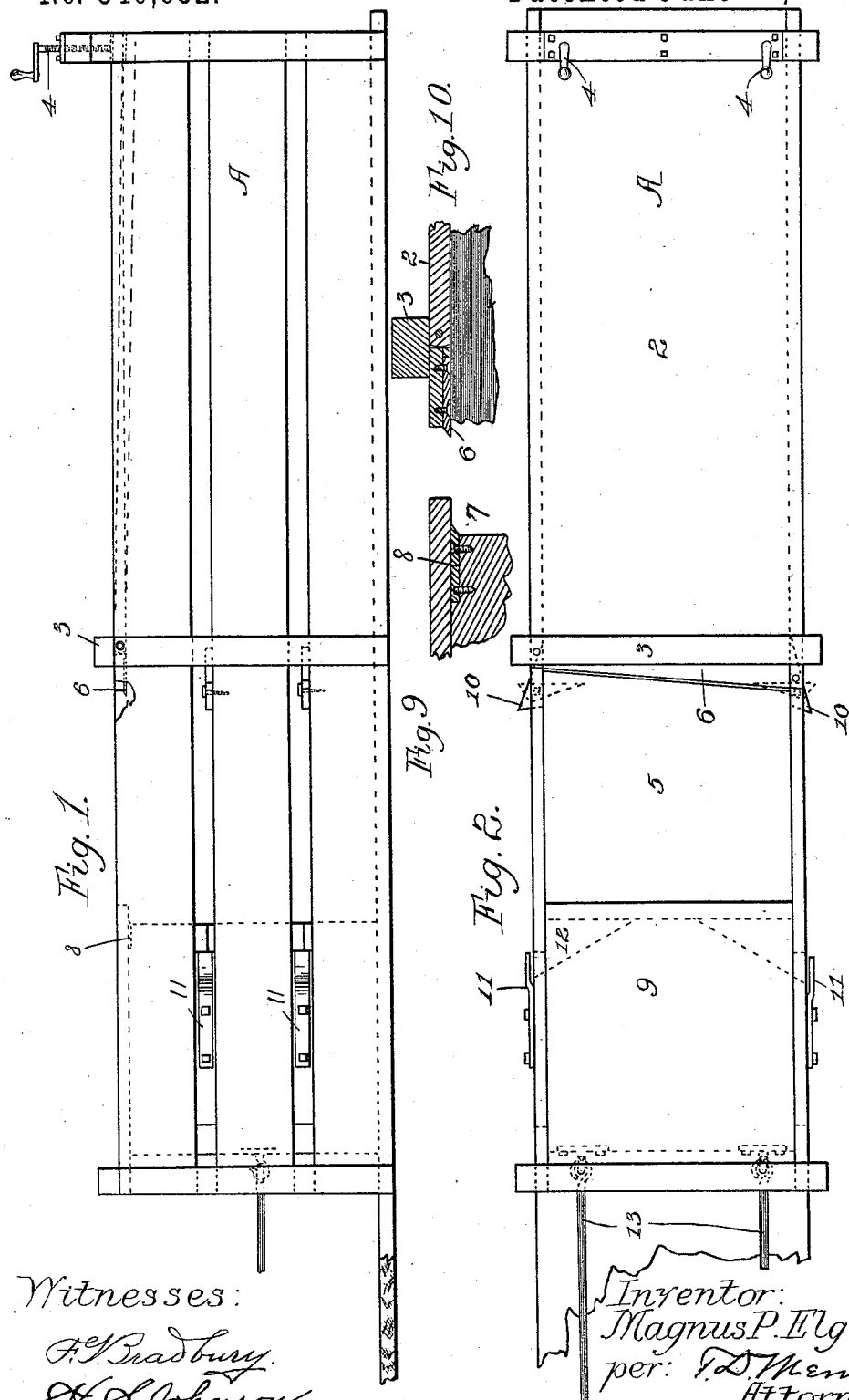
Witnesses:
F. S. Bradbury.
H. S. Johnson
Inventor:
Magnus P. Elgen.
per: T. D. Mennin
Attorney.

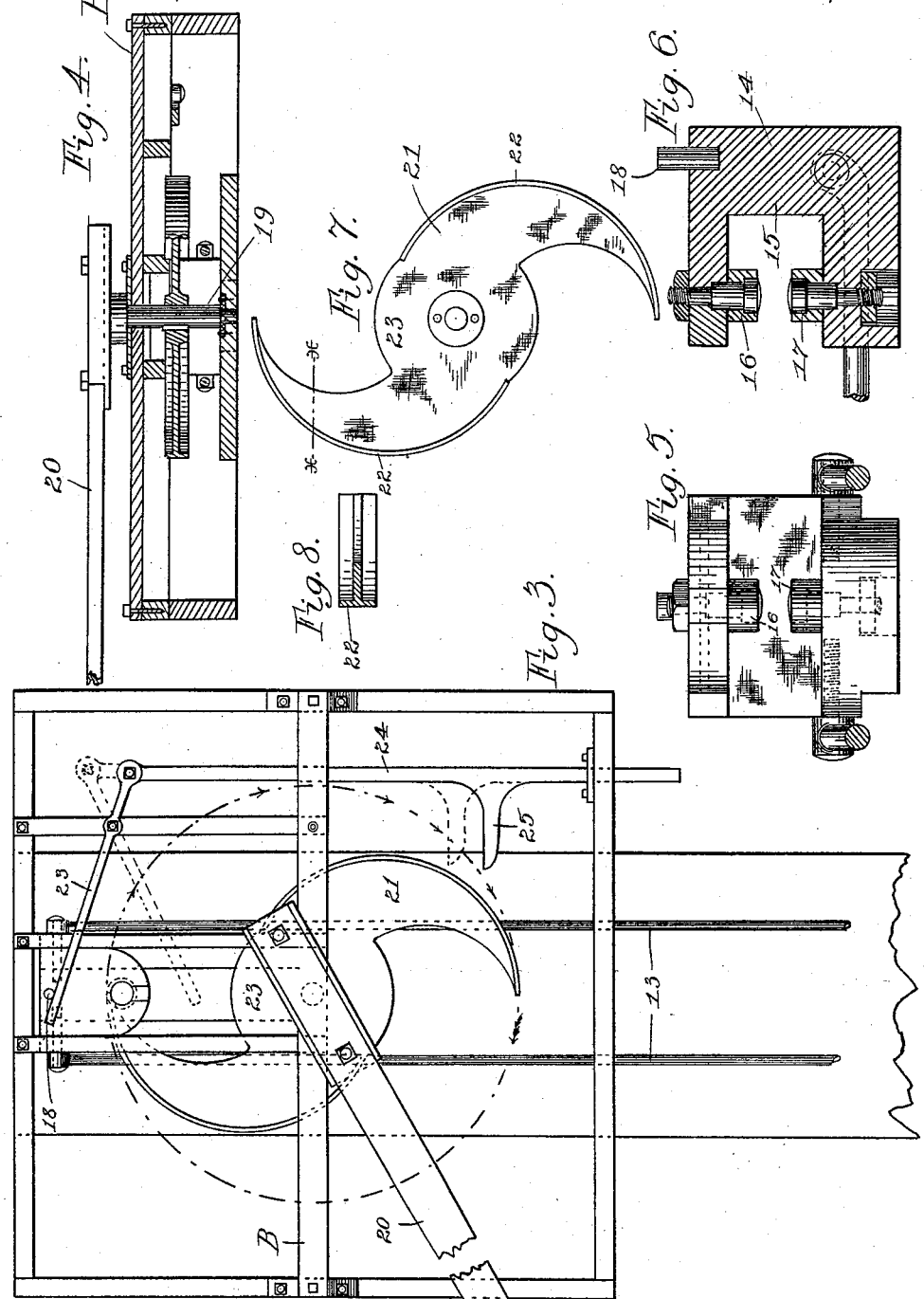

UNITED STATES PATENT OFFICE.

MAGNUS PEDER ELGEN, OF ST. PAUL, MINNESOTA, ASSIGNOR OF SIXTY-ONE ONE-HUNDREDTHS TO AUGUST JOHNSON AND ELIAS CRONSTEDT, OF SAME PLACE.

BALING-PRESS.

SPECIFICATION forming part of Letters Patent No. 540,652, dated June 11, 1895.

Application filed October 9, 1894. Serial No. 525,333. (No model.)

*To all whom it may concern:*

Be it known that I, MAGNUS PEDER ELGEN, of St. Paul, Ramsey county, Minnesota, have invented certain Improvements in Baling-Presses, of which the following is a specification.

My invention relates to improvements in presses designed for the baling of hay, straw, cotton and similar material, and consists of improved means for actuating the plunger and other specific features hereinafter particularly described and claimed.

In the accompanying drawings, forming part of this specification, Figure 1 is a side elevation of the press-box. Fig. 2 is a top view of the same. Fig. 3 is a plan view of the plunger-operating mechanism. Fig. 4 is a central vertical section of the same. Figs. 5 and 6 are details of the anti-friction rolls upon the plunger-rods which are engaged by the operating-cam. Figs. 7 and 8 are details of the cam; and Figs. 9 and 10 are sectional details showing the shearing-knives secured to the plunger and the press-box adjacent the hopper-opening, respectively, for trimming off the projecting fiber or stalks of material as the plunger-head passes forward into the box.

In the drawings A represents the press box of the ordinary general construction, the top 2 of which is preferably hinged at the central frame piece 3, and provided with adjusting screws 4 at the outer end by means of which it can be forced inward as indicated by dotted lines in Fig. 1, so as to increase the pressure upon the inclosed material. Between the frame piece 3 and the top board 9 is the hopper opening 5, into which the hay or other material to be compressed is placed. At the top of the box and adjacent to the frame piece 3 is a diagonal knife 6, and a similar knife 8 upon the top of the plunger 7, which act as shears in the forward movement of the plunger, to cut off any projecting fiber or material as the plunger passes into the box. In the sides of the box, but below the knife 6 are arranged pivoted dogs 10, which can be turned into full line position to admit the material to the box A, but the material rebounding as the plunger is withdrawn, catches the points of the dogs, turning them to the dotted line position, bearing against the end of the slots in the side walls or other stops, in which position they prevent the further movement of the material. The dogs are positively operated by means of the fingers 11 upon the sides of the plunger, the plunger being socketed as at 12 to receive the dogs.

As shown in the drawings, the plunger is provided preferably with a pair of plunger rods 13, between the ends of which is arranged a block 14 having its side toward the box provided with a horizontal, transverse groove 15, upon the top and bottom side walls of which are pivoted anti-friction rolls 16 and 17. Projecting from the top of the block is the pin 18 for the purposes hereinafter described. Mounted upon a vertical shaft 19 suitably journaled in the frame B is the sweep or power arm 20, to which is bolted the double cam 21. Each member of the cam is of similar form, the outer edge being provided with a double flange 22, which extends back to the central part 23 of the cam, there being cut away as shown in Fig. 7. These cams are of such size and so positioned that in the operation of the sweep in Fig. 3, their points enter successively the groove 15 in the block 14, the double flange 22 engaging the anti-friction rolls 16 and 17, whereby in the movement of the sweep, the block 14 is drawn forward until the rolls reach the end of the flange, when the block is free to be returned to its normal position, and the plunger withdraws from the press box. Any suitable means for thus withdrawing the plunger may be employed, but I prefer to use the construction in which the pivoted lever 23 is mounted upon the frame B and adapted to engage the pin 18. Connected with the short or power arm of the lever is the reciprocating rod 24, which is provided with a projection or step 25, so positioned that the moment the anti-friction rolls are freed from the flange upon one cam, the point of the other cam strikes the step, sliding the bar 24 and operating the lever 23 to throw the head 14 and its connected parts back to original or normal position.

If it is desired to operate the press by means of engine power, a belt pulley can be mounted on the shaft 19, the working parts being unchanged, except as it may be expedient to slightly readjust them.

The operation of the device is evident from the drawings and foregoing description. The hay or other material is forked into the opening in the top of the press box where the plunger in its forward movement meets and carries it into the inclosed portion of the box, tripping the dogs in the manner described so that the material is prevented from rebounding into the hopper opening, the projecting parts of the material being sheared off by the knives as above described in the reciprocating of the plunger. The anti-friction rolls and pin 18 are arranged in line with the shaft 19 so that there is no side strain or rack to the opening parts, the movement of the plunger and its attachments, being in direct line with the power shaft.

I claim—

1. In a baling press, the combination with the plunger head, and the power shaft arranged in the line of travel of said plunger, of the plunger rods arranged one on each side of said shaft and connected to said plunger head, the grooved block carried by said rods and arranged on the opposite side of said shaft from the plunger head, the anti-friction rolls arranged in said groove, the cam mounted upon said shaft, the double flange upon said cam adapted to engage said anti-friction rolls, and extending nearly to the pivot of the cam.

2. In a baling press, the combination with the plunger and power shaft arranged in the line of travel of said plunger, of the plunger rods arranged one on each side of said shaft and connected with the plunger, the block carried by said rods on the opposite side of said shaft from said plunger, the cam mounted upon said shaft, and having a flange extending nearly to its pivot adapted to engage a projection upon said block and draw the same toward said shaft, and the tripping device adapted to be operated by said cam to engage and reverse the movement of said block when the same has been freed from said flange.

3. In a baling press, the combination with the plunger and the power shaft arranged in the line of its travel, of the rods arranged on each side of said shaft and connected to said plunger, the block carried by said rods and provided with a horizontal transverse groove in the face adjacent the shaft, the anti-friction rolls arranged upon the top and bottom walls of said groove, the flanged cam carried by said shaft and adapted to enter said groove so as to cause its flanges to engage said rolls and draw said block toward said shaft, the pivoted lever engaging said block, the reciprocating rod connected to the power end of said lever, and the step upon said rod adapted to be struck by the end of said cam so as to operate said lever to reverse the movement of said plunger.

4. In a baling press, the combination of the plunger, the power shaft arranged in line with its travel, the pair of rods connected to said plunger and arranged one on each side of said shaft, the block carried by said rods on the opposite side of the shaft from said plunger, the cam carried by said shaft, and the flanges upon said cam adapted to engage said block to draw the same toward the shaft, whereby the power is at all times applied to the plunger in line with its path of travel.

5. In a baling press, the combination with the plunger, of the power shaft arranged in the center line of the path of movement of said plunger, the rods connected to said plunger and arranged on each side of said shaft, the block carried by said rods on the side of the shaft opposite the plunger, the arms carried by said shaft, the cam flanges upon said arms extending from the outer end thereof to a point near the shaft and adapted to engage said block in the movement of the shaft and draw the same toward the shaft until freed from the flanges, and the trip adapted to be engaged by said arms when the head is freed from its flanges and to return said head to normal position.

6. In a baling press, the combination with the plunger, and the power shaft arranged in line with its path of travel, of the cam carried by said power shaft, the plunger rods carried by said plunger, the block carried by said rods adjacent said cam, and the flanges upon said cam adapted to successively engage said block to actuate said plunger.

7. In a baling press, the combination with the plunger and the power shaft arranged in line with its path of travel, of the plunger rods, the block carried by said rods provided with a horizontal transverse groove, and the cam carried by said power shaft and adapted to enter said groove to draw the block toward the shaft and thereby actuate the plunger.

8. In a baling press, the combination with the plunger and the power shaft, of the plunger rods, the block carried by said rods on the opposite side of the shaft from said plunger, the flanged cam carried by said shaft and adapted to engage said block to carry the same toward the shaft, and the means actuated by said cam to reverse the movement of said block.

In testimony whereof I affix my signature in presence of two witnesses.

MAGNUS PEDER ELGEN.

Witnesses:
T. D. MERWIN,
H. S. JOHNSON.